US010039056B2

(12) United States Patent
Kim et al.

(10) Patent No.: US 10,039,056 B2
(45) Date of Patent: Jul. 31, 2018

(54) APPARATUS AND METHOD FOR SAVING POWER BY TRANSMISSION INTERVAL IN WIRELESS COMMUNICATION SYSTEM

(71) Applicant: Samsung Electronics Co., Ltd., Suwon-si, Gyeonggi-do (KR)

(72) Inventors: Tae-Yoon Kim, Seongnam-si (KR); Min-Goo Kim, Hwaseong-si (KR); Seong-Woo Ahn, Yongin-si (KR); Jong-Han Lim, Seoul (KR); Chae-Man Lim, Seoul (KR); Young-Seok Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/177,805

(22) Filed: Feb. 11, 2014

(65) Prior Publication Data
US 2014/0254444 A1 Sep. 11, 2014

Related U.S. Application Data

(60) Provisional application No. 61/773,383, filed on Mar. 6, 2013.

(30) Foreign Application Priority Data

Apr. 5, 2013 (KR) .......................... 10-2013-0037606
Apr. 12, 2013 (KR) .......................... 10-2013-0040506

(51) Int. Cl.
H04W 52/02 (2009.01)

(52) U.S. Cl.
CPC ......... *H04W 52/0225* (2013.01); *Y02D 70/00* (2018.01); *Y02D 70/1262* (2018.01); *Y02D 70/24* (2018.01)

(58) Field of Classification Search
CPC ............. H04W 52/0225; H04W 24/08; H04W 52/0232; H04W 52/0219; H04W 52/0258;
(Continued)

(56) References Cited

U.S. PATENT DOCUMENTS

2007/0218939 A1    9/2007  Lim et al.
2009/0016252 A1    1/2009  Ho et al.
(Continued)

FOREIGN PATENT DOCUMENTS

CN    102484540 A    5/2012
CN    102726105 A    10/2012
(Continued)

OTHER PUBLICATIONS

Changhoi Koo et al., IEEE 802.16e Sleep Mode Enhancement, IEEE 802.16 Broadband Wireless Access Working Group, May 13, 2003, pp. 1-16.
(Continued)

Primary Examiner — Walli Butt
(74) Attorney, Agent, or Firm — Jefferson IP Law, LLP

(57) ABSTRACT

An apparatus and a method for controlling power consumption of a terminal in a wireless communication system are provided. The method includes deactivating one or more of hardware components for signal reception in a transmission interval if there is no data to be received in the transmission interval, and receiving a control signal by activating all the components in a next transmission interval.

37 Claims, 11 Drawing Sheets

(58) Field of Classification Search
CPC ......... H04W 52/0209; H04W 52/0283; H04W 52/0245; H04B 13/005; Y02B 60/50; Y02D 70/00; Y02D 70/1262; Y02D 70/24
USPC ........ 370/252, 311, 241, 328, 344; 455/418, 455/41.1, 67.11; 600/347; 375/346; 330/149
See application file for complete search history.

(56) References Cited

U.S. PATENT DOCUMENTS

| | | | |
|---|---|---|---|
| 2009/0061866 A1 | 3/2009 | Hwang | |
| 2009/0072900 A1* | 3/2009 | Park et al. | ................... 330/149 |
| 2011/0176466 A1 | 7/2011 | Lindoff et al. | |
| 2011/0237201 A1* | 9/2011 | Bonjour | ............ H04W 52/0283 455/67.11 |
| 2012/0171954 A1* | 7/2012 | Rudland | ........... H04W 52/0225 455/41.1 |
| 2012/0196553 A1 | 8/2012 | Karaguz | |
| 2012/0307772 A1 | 12/2012 | Kwon et al. | |
| 2013/0021935 A1 | 1/2013 | Chun et al. | |
| 2013/0115908 A1* | 5/2013 | Karaoguz | ............ H04B 1/1615 455/343.2 |
| 2013/0194995 A1* | 8/2013 | Reinhardt | ......... H04W 52/0219 370/311 |
| 2013/0242826 A1* | 9/2013 | Black | ................ H04W 52/0229 370/311 |
| 2013/0301508 A1* | 11/2013 | Almog | .............. H04W 52/0229 370/311 |
| 2014/0169246 A1* | 6/2014 | Chui | ................. H04W 52/0258 370/311 |
| 2014/0185456 A1* | 7/2014 | Yu et al. | ....................... 370/241 |

FOREIGN PATENT DOCUMENTS

| | | | |
|---|---|---|---|
| KR | 10-2007-0089516 A | | 8/2007 |
| KR | 10-2011-0093166 A | | 8/2011 |
| WO | 2012048717 A1 | | 4/2012 |
| WO | 2012/104749 A1 | | 8/2012 |

OTHER PUBLICATIONS

Australian Notice of Acceptance dated Jan. 29, 2018, issued in Australian Application No. 2014226792.
European Office Action dated Jan. 29, 2018, issued in European Application No. 14 759 544.1.
Chinese Office Action dated Jan. 31, 2018, issued in Chinese Application No. 201480012518.5.

* cited by examiner

APPARATUS AND METHOD FOR SAVING POWER BY TRANSMISSION INTERVAL IN WIRELESS COMMUNICATION SYSTEM

CROSS-REFERENCE TO RELATED APPLICATION(S)

This application claims the benefit under 35 U.S.C. § 119(e) of a U.S. provisional patent application filed on Mar. 6, 2013 in the U.S. Patent and Trademark Office and assigned Ser. No. 61/773,383, and under 35 U.S.C. § 119(a) of a Korean patent application filed on Apr. 5, 2013 in the Korean Intellectual Property Office and assigned Serial number 10-2013-0037606, and a Korean patent application filed on Apr. 12, 2013 in the Korean Intellectual Property Office and assigned Serial number 10-2013-0040506, the entire disclosure of each of which is hereby incorporated by reference.

TECHNICAL FIELD

The present disclosure relates to control of power consumption in a wireless communication system. More particularly, the present disclosure relates to an apparatus and a method for improving power saving performance of a terminal in a wireless communication system.

BACKGROUND

In a packet-based system, such as 3rd Generation Partnership Project-Long Term Evolution (3GPP-LTE) system, a signal transmitted to a terminal is transmitted by a specific time unit, such as a Transmission Time Interval (TTI). Therefore, a signal transmitted to one terminal may or may not be present in every TTI. Information as to whether data transmitted to a terminal in each TTI is present or not is transferred through a control signal transmitted in an early part of the TTI. The terminal determines whether data transmitted within the TTI is present by decoding the control signal, and acquires information used for decoding the data. The terminal decodes a data signal in a latter part of the TTI excluding the control signal. Therefore, the terminal is unable to determine in advance whether a signal is transmitted to the terminal within each TTI, and thus, the terminal should decode the control signal in every TTI. Resultantly, even though data is not actually transmitted, the terminal consumes power by operating hardware for receiving a control signal in every TTI.

A wireless communication system including 3GPP supports a Discontinuous Reception (DRX) mode in order to reduce power consumption of a terminal. An LTE system supports the DRX mode not only in a Radio Resource Control (RRC)_IDLE state but also in an RRC_CONNECTED state to more actively control power. In this case, the terminal does not always monitor the control signal of TTI but discontinuously monitor the control signal of TTI during a determined interval, through the DRX operation. Here, the control signal may be referred to as a "Physical Downlink Control CHannel (PDCCH)".

FIG. 1 illustrates a DRX cycle in a wireless communication system according to the related art.

Referring to FIG. 1, a DRX cycle 100 includes a reception interval 110, and a non-reception interval 120. Here, the reception interval 110 and the non-reception interval 120 may be referred to as an on-duration and an opportunity for DRX, respectively. The reception interval 110 is a downlink subframe time during which a terminal is awake and on standby in order to receive PDCCH in a DRX mode. During the reception interval 110, if there is no successfully decoded PDCCH, the terminal enters a sleep mode until a next reception interval 110 starts. On the other hand, if the PDCCH is successfully decoded, the terminal operates an inactivity timer according to conditions, and is awake until the inactivity timer expires.

The inactivity timer means a downlink subframe time, which is a waiting time from the last successful decoding of PDCCH to the newly successful decoding of PDCCH by the terminal. For example, during an on-state of the inactivity timer, the terminal attempts to decode the PDCCH while continuing to be awakened, and, if the PDCCH is not successfully decoded until the inactivity timer expires, the terminal enters a sleep mode. The terminal starts or restarts the inactivity timer after successful decoding of each PDCCH which is not re-transmitted but newly transmitted.

A whole time when the terminal is awake during the DRX mode is called an active time. The active time includes the reception interval 110 of the DRX cycle 100, a time during which the terminal continues to receive until the inactivity timer expires, and a time during which the terminal continues to receive while waiting for downlink re-transmission after one Hybrid Automatic Repeat reQuest (HARQ) Round Trip Time (RTT). Accordingly, the minimum of the active time is equal to the reception interval 110 of the DRX cycle 100, but the maximum of the active time is not limited.

When the DRX mode is set, the terminal operates according to a DRX procedure in every TTI. The TTI may be defined as one subframe having a length of 1 ms. Accordingly, there is a time interval during which a signal is not transmitted from a base station to the terminal according to mutually agreed patterns between the terminal and the base station, and thus, the terminal can save power by controlling power associated with reception during the time interval.

To effectively save power through the DRX mode, the DRX operation should be performed by a small number of TTIs, such as a short DRX. However, the short DRX cannot perfectly respond to data allocation properties varying actually and dynamically since the base station and the terminal are performed in a prescheduled manner. For example, due to the limitation in DRX scheduling and the mismatch between actual data allocation properties, the power saving efficiency of the DRX operation is slightly lowered.

Therefore, a need exists for an apparatus and a method for improving power saving performance of a terminal in a wireless communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for improving power saving performance of a terminal in a wireless communication system.

Another aspect of the present disclosure is to provide an apparatus and a method for controlling power consumption in a transmission interval according to a decoding result of a control signal in a wireless communication system.

Another aspect of the present disclosure is to provide an apparatus and a method for controlling power consumption of hardware components for signal reception according to whether a data signal should be decoded within a transmission interval in a wireless communication system.

In accordance with an aspect of the present disclosure, a method for operating a terminal in a wireless communication system is provided. The method includes deactivating one or more of hardware components for signal reception in a transmission interval when there is no data to be received in the transmission interval, and receiving a control signal by activating all of the hardware components in a next transmission interval.

In accordance with another aspect of the present disclosure, a terminal apparatus in a wireless communication system is provided. The apparatus includes a Radio Frequency (RF) processing unit and a baseband processing unit configured to receive signals in a transmission interval, and a controller configured to control one or more of hardware components for signal reception included in the RF processing unit and the baseband processing unit to be deactivated in the transmission interval if there is no data to be received in the transmission interval, and to control a control signal to be received by activating all of the hardware components in a next transmission interval.

In accordance with another aspect of the present disclosure, a terminal apparatus in a wireless communication system is provided. The apparatus includes a plurality of hardware components configured to receive signals in a transmission interval, and a control module configured to control one or more of the plurality of hardware components for signal reception included in the RF processing unit and the baseband processing unit to be deactivated in the transmission interval if there is no data to be received in the transmission interval, and to control a control signal to be received by activating all of the plurality of hardware components in a next transmission interval.

In accordance with another aspect of the present disclosure, a terminal apparatus in a wireless communication system is provided. The apparatus includes a plurality of hardware components configured to receive signals, wherein one or more of the plurality of hardware components is deactivated in the transmission interval if there is no data to be received in the transmission interval, and wherein a control signal is received by activating the one or more of the plurality of hardware components in a next transmission interval.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
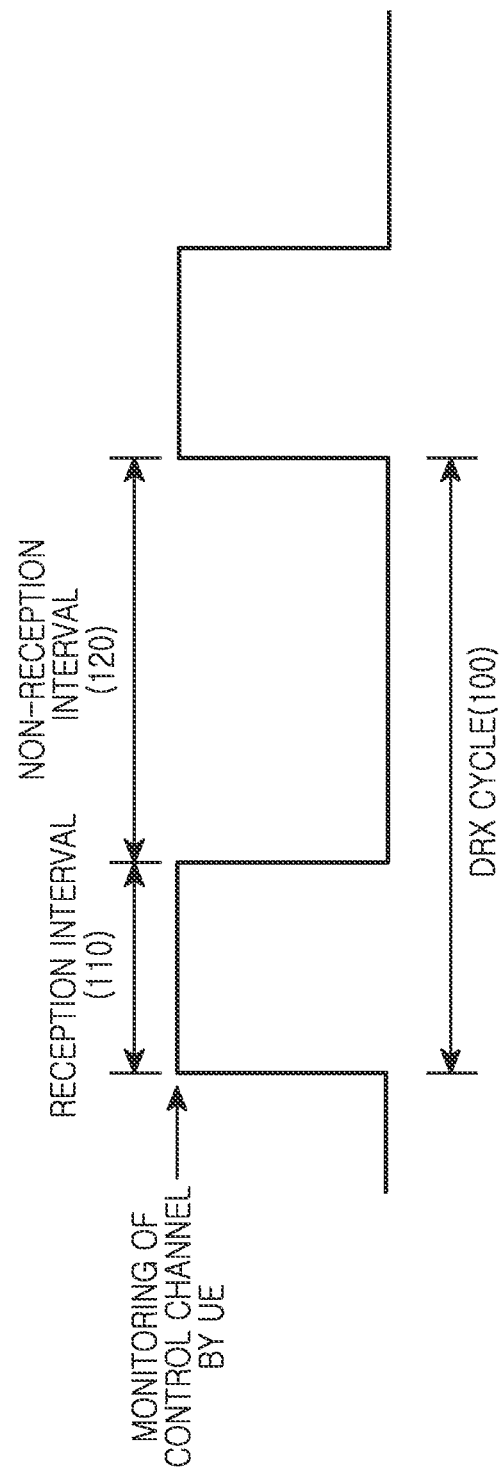
FIG. 1 illustrates a Discontinuous Reception (DRX) cycle in a wireless communication system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, the present disclosure will describe a technology of performing a control operation to reduce power consumption by a transmission interval in a wireless communication system. Specifically, the present disclosure suggests a scheme for saving power of a terminal, in a wireless communication system in which a downlink signaling includes an early-part control signal which informs whether data transmitted to a terminal is present in a transmission interval, and a latter-part data signal. The transmission interval described in the present disclosure may be referred to as a "Transmission Time Interval (TTI)", a "subframe", or the like.

In a system using a packet transmission method, to improve data processing efficiency in a terminal and network efficiency, a base station performs scheduling by every transmission interval, and transmits the scheduled results to terminals in every transmission interval. In a 3rd Generation Partnership Project-Long Term Evolution (3GPP-LTE) system, a control channel for transmitting data allocation information is present in an early part of every transmission interval (e.g., TTI), and actual data is transmitted in a subsequent latter part of TTI. Here, the control signal may be referred to as "Physical Downlink Control CHannel (PDCCH)". For example, the terminal may determine whether data allocated and transmitted to the terminal within the transmission interval is present by decoding the control channel in every transmission interval. In this case, if it is determined that data is not received in the transmission interval, the terminal controls power consumption of a hardware for signal reception, thereby maximizing power saving efficiency. For convenience of description, a state where the above-described power saving technique is carried out will be hereinafter referred to as "dynamic power saving mode" in the present disclosure.

Figure 2:
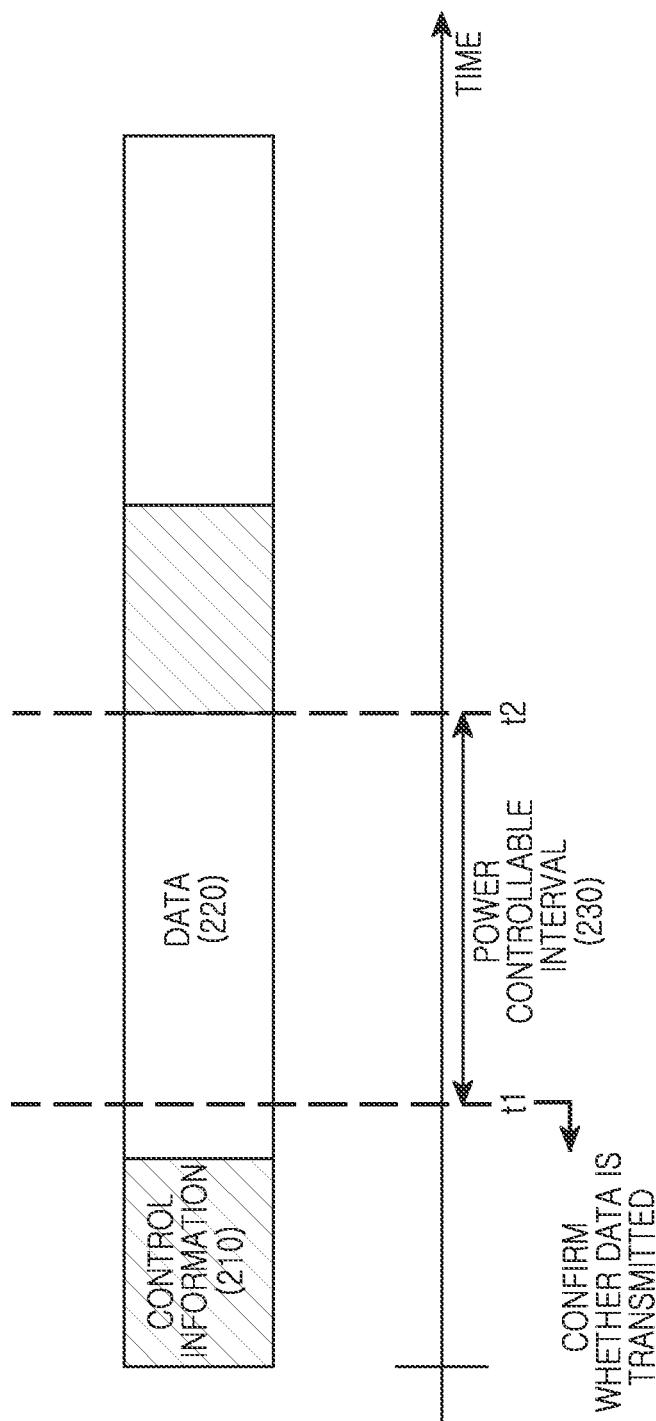
FIG. 2 illustrates an interval during which a power saving operation is performed in a wireless communication system according to an embodiment of the present disclosure.

FIG. 2 illustrates an interval during which a power saving operation is performed in a wireless communication system according to an embodiment of the present disclosure. FIG. 2 illustrates two transmission intervals.

Referring to FIG. 2, the transmission interval includes a first part carrying control information 210, and a second part carrying data 220. A terminal determines whether downlink data transmitted to the terminal in the second part is present through the control information 210. Therefore, during the reception interval of the control information 210, the terminal activates hardware components for signal reception. Accordingly, the terminal may determine whether data is transmitted, at a timing t1 when the control information 210 is completely received and the control information 210 is completely decoded. At this time, if there is no downlink data to the terminal, the terminal may deactivate all or some of hardware components for signal reception, during an interval 230 from the timing t1 when the decoding of the control information 210 is completed to a timing t2 when a next transmission interval starts.

As described above, in the dynamic power saving mode, the terminal determines that there is no downlink data to be received within one transmission interval, and controls the hardware components, which is different from the Discontinuous Reception (DRX) of the related art. Therefore, in the dynamic power saving mode, a time length of a power controllable interval is very short.

Although power control is performed in the dynamic power saving mode, power control should be canceled so as to receive a control channel during an early part of a next transmission interval. In other words, after deactivating all or some of hardware components for power saving, the terminal should activate all of the hardware components in order to receive the control channel in the early part of the next transmission interval. Front End Module (FEM) components, such as a Phase Loop Lock (PLL), a Voltage Control Oscillator (VCO), a Low Noise Amplifier (LNA), a mixer, a Local Oscillator (LO), and an Analog to Digital Converter (ADC) are different from each other in a switching time related to a warm-up time and an internal initial value problem. Here, the internal initial value problem means that a set value is arbitrarily set to a certain unintended value when the terminal is turned on after power-off. For example, in a case of a PLL, an initial phase value may be set to an arbitrary value when the terminal is turned on after power-off.

For example, the hardware components for signal reception may have different switching times and internal initial value problems. Therefore, to achieve the maximum power saving effect, there is a need to individually control power of each component or to control power of each component group by grouping the components with similar switching times, after comparing the power controllable interval 230 in FIG. 2 with a switching time and a time taken to normalize the internal initial value.

In this case, a control interface to the FEM in a baseband modem may be implemented by each component or component group according to a power control frequency. In other words, the control interface may be differently defined according to power control timing requirements.

In addition, the power control for each component or each component group may include switching to a stand-by state or a sleep state as well as a simple power-off. Alternatively, some components or component groups may be maintained such that they are always turned on. For example, the dynamic power saving mode may define a control type as on/off, switching to a stand-by state, switching to a sleep state, always-on, or the like, based on a state switching time, on/off timing, and an initial value problem of each component or each component group. Accordingly, when the power controllable interval arrives, some of the components are turned off, some of the components are switched to a stand-by state or a sleep state, and some of the components maintain their on-states.

To maximize the power saving effect of the dynamic power saving mode, it is favorable to decode the control signal carrying data allocation information as fast as possible. As the control signal is decoded faster, the power controllable interval of the transmission interval gets longer. In the present disclosure, a channel estimation operation is defined with multiple modes to rapidly decode the control signal.

The present disclosure suggests different channel estimation methods for respective intervals of a control channel and a data channel in the dynamic power saving mode.

A description will be given of a control channel decoding process. The terminal according to an embodiment of the present disclosure uses a minimum Cell specific Reference Signal (CRS) in order to decode a control signal in an early part of the transmission interval. For example, in a 2-transmission antenna LTE system, there are four CRS Orthogonal Frequency Division Multiplexing (OFDM) symbols in the transmission interval. In this case, to decode the control channel rapidly, the terminal may perform channel estimation using one, two, three or four reference signal symbols in a front stage. A specific channel estimation algorithm may vary with the number of reference signal symbols used.

A description will be given of a data channel decoding process. When it is determined through the control channel decoding that there is downlink data to be received in the transmission interval, the terminal may perform channel estimation for decoding the data channel using all reference signal symbols.

The present disclosure suggests a channel estimation method for a control channel according to a current situation of the terminal in the dynamic power saving mode as follows.

As described above, as the channel estimation for decoding the control channel is performed faster, the power controllable interval becomes longer in the dynamic power saving mode, thereby maximizing the power saving effect. To this end, the terminal according to an embodiment of the present disclosure may select a number of reference signal symbols to be used for channel estimation and a channel estimation method, based on channel conditions, such as the reliability and stability of a channel. For example, the channel condition may be Signal to Interference and Noise Ratio (SINR), Doppler frequency, and the like. For instance, as the SINR is higher, the terminal may estimate the channel using a smaller number of reference signal symbols. Furthermore, as the SINR is higher, the terminal may use a channel estimation method of which a processing time is shorter. In addition, if the Doppler frequency is low, a change in channel is relatively slow. Thus, as the Doppler frequency becomes lower, the terminal may estimate the channel using a smaller number of reference signal symbols.

In a case of a carrier wave aggregation using multiple carrier frequencies at the same time, the terminal independently performs power control on the FEM and the baseband modem used for each carrier wave by a Component Carrier (CC), thereby making it possible to maximize the power saving effect.

Figure 3:
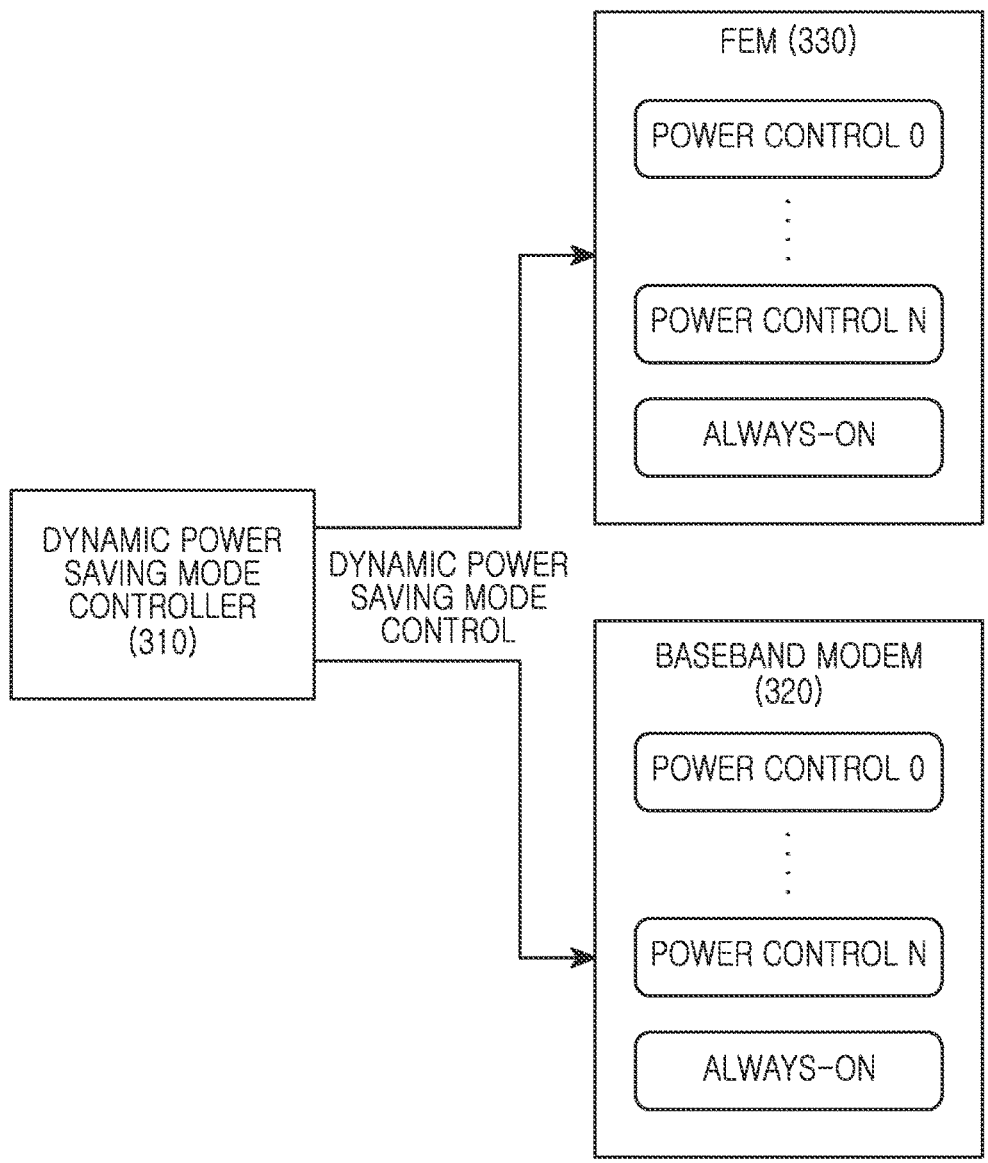
FIG. 3 illustrates a configuration for a dynamic power saving mode in a wireless communication system according to an embodiment of the present disclosure.

FIG. 3 illustrates a configuration for a dynamic power saving mode in a wireless communication system according to an embodiment of the present disclosure.

Referring to FIG. 3, for the dynamic power saving mode, an apparatus includes a dynamic power saving mode controller 310, a baseband modem 320, and an FEM 330.

The dynamic power saving mode controller 310 controls power consumption of components in the baseband modem 310 and the FEM 330 by using data allocation information which is obtained through decoding of the control signal within the transmission interval. Specifically, depending on determination results as to whether data is allocated, through decoding of the control signal within the transmission interval, the dynamic power saving mode controller 310 controls power consumption of the components individually or component groups according to characteristics of the components in the FEM 330. The components in the baseband modem 320 operate according to multiple modes to achieve the minimum performance loss and minimum processing time. Furthermore, when multiple carrier frequencies are used, the dynamic power saving mode controller 310 may independently control the components used for each carrier wave in the FEM 330 and the baseband modem 320.

Figure 4:
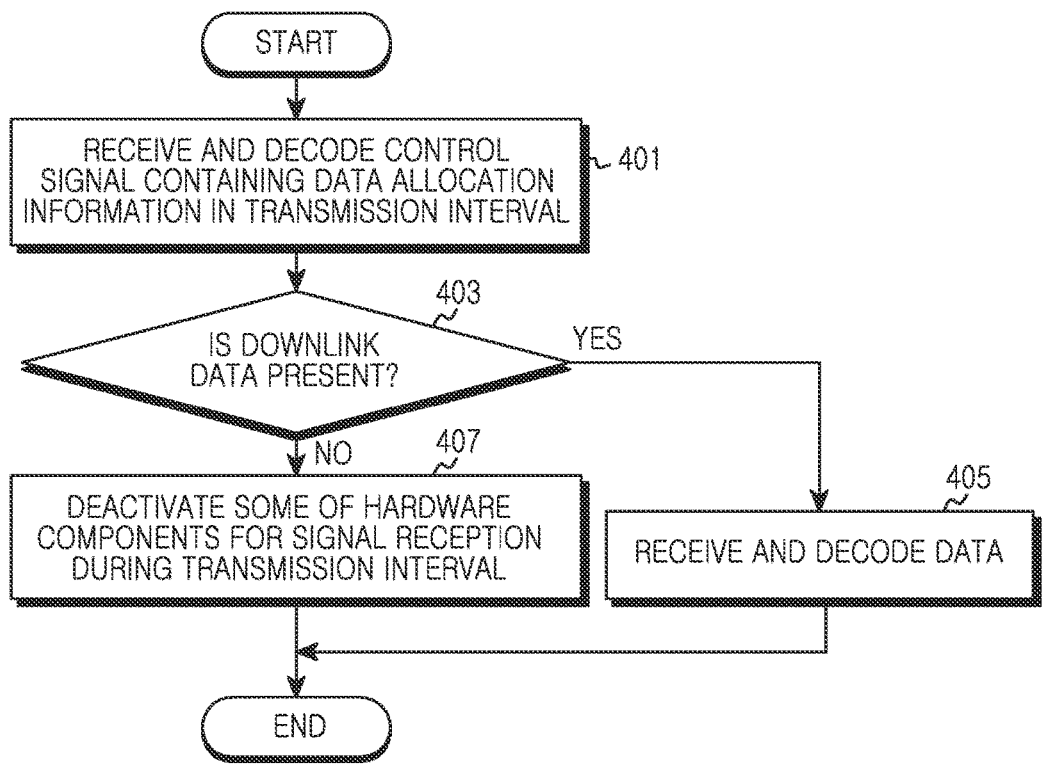
FIG. 4 is a flowchart illustrating an operating procedure of a terminal in a wireless communication system according to an embodiment of the present disclosure.

FIG. 4 is a flowchart illustrating an operating procedure of a terminal in a wireless communication system according to an embodiment of the present disclosure.

Referring to FIG. 4, in operation 401, the terminal receives and decodes a control signal containing data allocation information within the transmission interval. To this end, the terminal activates all hardware components for signal reception. Here, the hardware includes a Radio Frequency (RF) processing unit, and a baseband processing unit. The RF processing unit may include the FEM. The control signal is received through a certain region of the early part of the transmission interval, and includes information indicating whether data transmitted to the terminal is present in a region other than the early part of the transmission interval. For example, the control signal includes data allocation information.

After decoding the control information, the terminal determines whether downlink data is present in operation 403. In other words, the terminal determines whether downlink data is transmitted to the terminal in the transmission interval during which the control signal is received. Specifically, by use of the data allocation information acquired from the control information, the terminal determines whether the downlink data is allocated to the terminal.

If it is determined in operation 403 that the downlink data is present, the terminal receives and decodes the downlink data in operation 405. For example, the terminal receives the downlink data while keeping the state in which hardware components for signal reception are all activated.

In contrast, if it is determined in operation 403 that the downlink data is not present, the terminal deactivates some of the hardware components for signal reception during the transmission interval in operation 407. The hardware components for signal reception may have different switching times and internal initial value problems. Therefore, to achieve the maximum power saving effect, there is a need to individually control power of each component or to control power of each component group by grouping the components with similar switching times, in consideration of a switching time and a time taken to normalize the internal initial value. Therefore, the terminal controls the components, and particularly, controls each component or each component group to have one of a power-off state, a standby state or a sleep state, and an always-on state.

In the embodiment described with reference to FIG. 4, the terminal deactivates some hardware components for signal reception when there is no downlink data in the transmission interval. However, according to another embodiment of the present disclosure, even if the downlink data is present, the terminal may deactivate some hardware components in some of the transmission interval unless the downlink data is received throughout the transmission interval. In this case, some components, which are deactivated when there is no downlink data throughout the transmission interval, may differ from some components which are deactivated when there is no downlink data in some of the transmission interval.

Figure 5:
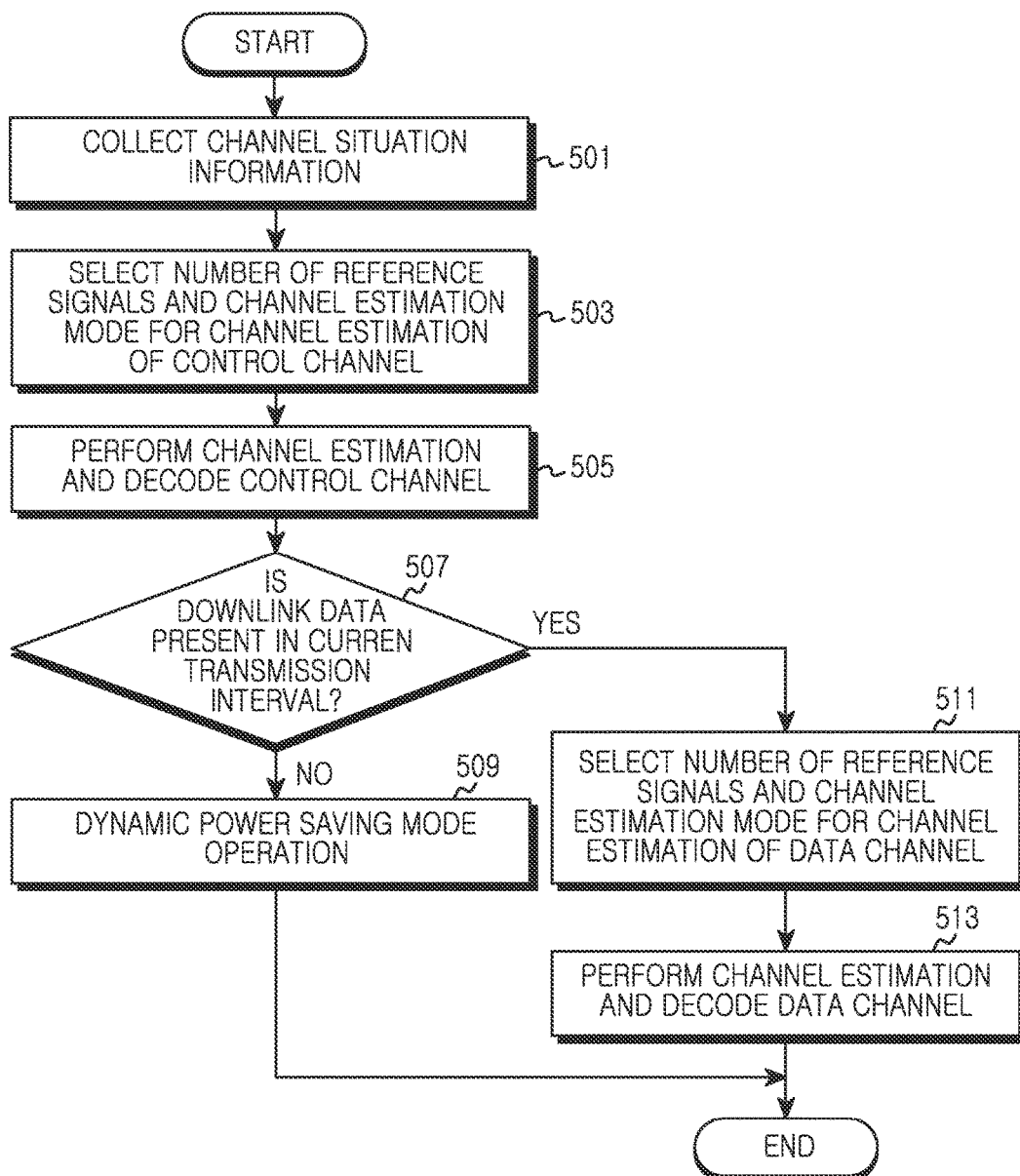
FIG. 5 is a flowchart illustrating an operating procedure of a terminal in a wireless communication system according to an embodiment of the present disclosure.

FIG. 5 is a flowchart illustrating an operating procedure of a terminal in a wireless communication system according to an embodiment of the present disclosure.

Referring to FIG. 5, the terminal collects channel condition information in operation 501. Here, the channel condition includes channel quality, Doppler frequency, and the like. For example, the channel quality may include at least one of a SINR, a Carrier to Interface and Noise Ratio (CINR), a Signal to Noise Ratio (SNR), a Received Signal Strength (RSS), and the like.

After collecting the channel condition information, the terminal selects a number of reference signals and a channel estimation mode for channel estimation of the control channel in operation 503, based on the channel condition information. For instance, as the channel quality improves, the terminal may determine that the channel will be estimated by using a smaller number of reference signal symbols. Furthermore, as the channel quality improves, the terminal may select a channel estimation mode of which a processing time is shorter. For instance, as the Doppler frequency is lower, the terminal may determine that the channel will be estimated by using a smaller number of reference signal symbols. If multiple carrier frequencies are used, the terminal independently performs the above-described decision on each component carrier.

Subsequently, the terminal performs channel estimation according to the selection in operation 505, and decodes the control channel. In other words, after estimating the control channel and equalizing the control signal using a channel estimation value, the terminal decodes the control signal. This allows the terminal to acquire data allocation information from the control signal.

Thereafter, the terminal determines whether downlink data is present in the transmission interval in operation 507 during which the control signal is received. In other words, the terminal determines whether downlink data is transmitted to the terminal during the transmission interval during which the control signal is received. Specifically, by use of data allocation information acquired through the control information, the terminal determines whether downlink data is allocated to the terminal.

If it is determined in operation 507 that the downlink data is present, the terminal operates in a dynamic power saving mode in operation 509. Specifically, the terminal deactivates some of the hardware components for signal reception during the transmission interval. In other words, the terminal controls the components, and particularly, controls each component or each component group to have one of a power-off state, a stand-by state or a sleep state, and an always-on state.

In contrast, if it is determined in operation 507 that there is no downlink data, the terminal selects a number of reference signals and a channel estimation mode for channel estimation of the data channel in operation 511, based on the channel condition information. For instance, as the channel quality improves, the terminal may determine that the channel will be estimated by using a smaller number of reference signal symbols. Furthermore, as the channel quality improves, the terminal may select a channel estimation mode of which a processing time is shorter. For instance, as the Doppler frequency is lower, the terminal may determine that the channel will be estimated by using a smaller number of reference signal symbols. If multiple carrier frequencies are used, the terminal independently performs the above-described decision on each component carrier.

Subsequently, the terminal performs channel estimation according to the selection and decodes the data channel in operation 513. In other words, after estimating the data channel and equalizing the data signal using a channel estimation value, the terminal decodes the data signal.

Figure 6:
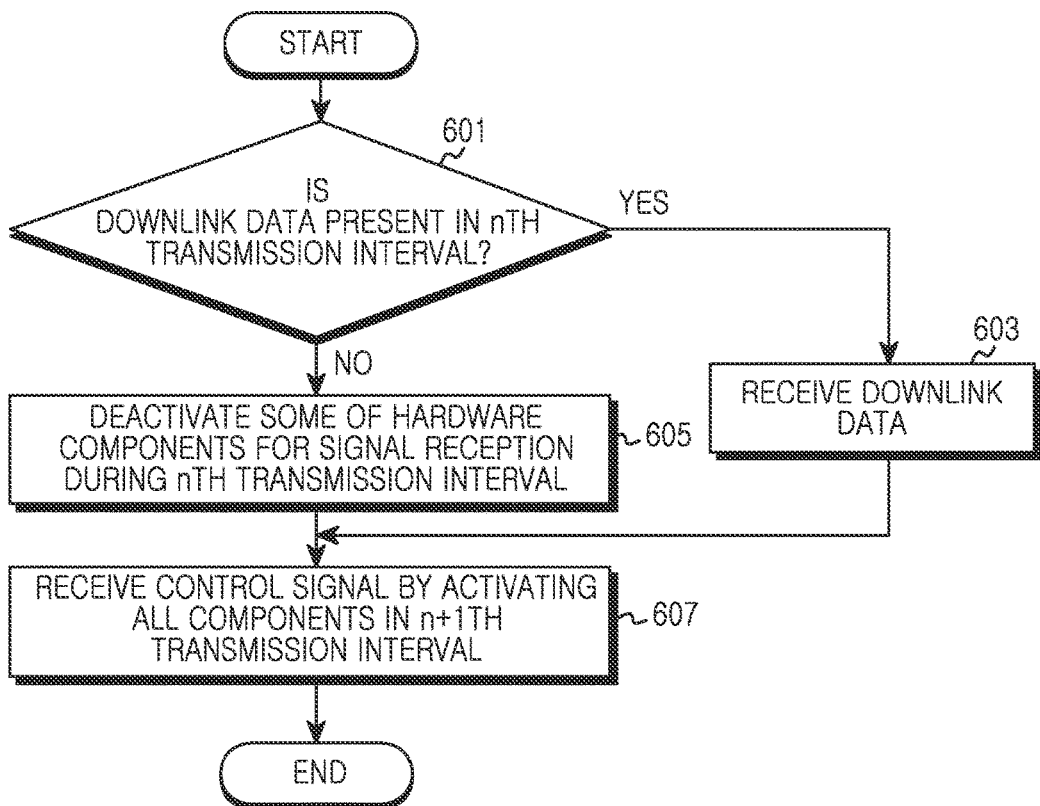
FIG. 6 is a flowchart illustrating an operating procedure of a terminal in a wireless communication system according to an embodiment of the present disclosure.

FIG. 6 is a flowchart illustrating an operating procedure of a terminal in a wireless communication system according to an embodiment of the present disclosure.

Referring to FIG. 6, in operation 601, the terminal determines whether downlink data is present in an nth transmission interval. Whether the downlink data in the nth transmission interval is present may be determined by decoding the control signal received in the nth transmission interval. For example, by using data allocation information acquired through the control information, the terminal determines whether downlink data is allocated in the nth transmission interval.

If the downlink data is present in the nth transmission interval, the terminal receives and decodes the downlink data in operation 603. For example, the terminal receives the downlink data while keeping the state in which hardware components for signal reception are all activated.

If the downlink data is not present in the nth transmission interval, the terminal deactivates some of the hardware components for signal reception during the nth transmission interval in operation 605. The hardware components for signal reception may have different switching times and internal initial value problems. Therefore, to achieve the maximum power saving effect, there is a need to individually control power of each component or to control power of each component group by grouping the components with similar switching times, in consideration of a switching time and a time taken to normalize the internal initial value. Therefore, the terminal controls the components, and particularly, controls each component or each component group to have one of a power-off state, a stand-by state or a sleep state, and an always-on state.

Thereafter, the terminal activates all of the components for signal reception in an n+1th transmission interval and receives a control signal of the n+1th transmission interval in operation 607. Here, the control signal may be received during a front stage of the n+1th transmission interval.

In the embodiment described with reference to FIG. 6, the terminal deactivates some hardware components for signal reception when there is no downlink data in the transmission interval. However, according to another embodiment of the present disclosure, even if the downlink data is present, the terminal may deactivate some hardware components in some of the transmission interval unless the downlink data is received throughout the transmission interval. In this case, some components, which are deactivated when there is no downlink data throughout the transmission interval, may differ from some components which are deactivated when there is no downlink data in some of the transmission interval.

FIGS. 7A, 7B, 7C, and 7D are block diagrams illustrating a configuration of a terminal in a wireless communication system according to embodiments of the present disclosure.

Figure 7A:
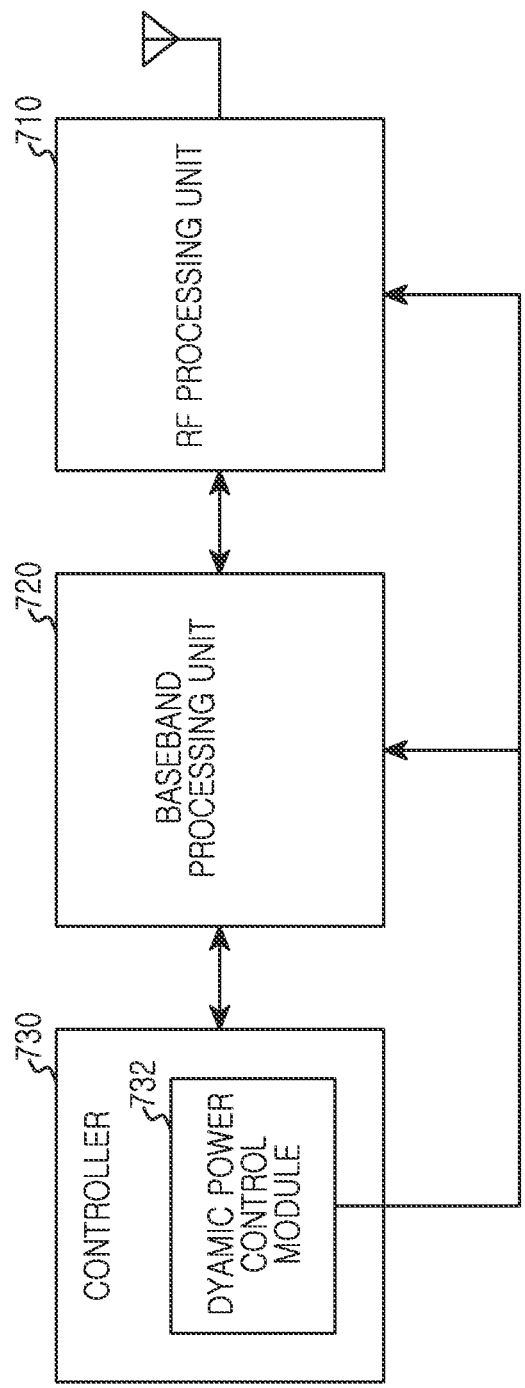
FIG. 7A is a block diagram illustrating a configuration of a terminal in a wireless communication system according to an embodiment of the present disclosure.

Referring to FIG. 7A, the terminal includes an RF processing unit 710, a baseband processing unit 720, and a controller 730.

The RF processing unit 710 performs functions of transmitting and receiving a signal through a wireless channel, such as a band conversion and an amplification of the signal. For example, the RF processing unit 710 up-converts a baseband signal provided from the baseband processing unit 720, transmits the up-converted baseband signal through an antenna, and down-converts an RF band signal received through the antenna to a baseband signal. For example, the RF processing unit 710 may include components, such as a PLL, a VCO, an LNA, a Power Amplifier (PA), a mixer, an LO, an ADC, a Digital to Analog Converter (DAC), and the like. Although only one antenna is illustrated in FIG. 7A, the terminal may include a plurality of antennae. In addition, the RF processing unit 710 may include a plurality of RF chains.

The baseband processing unit 720 performs a conversion function between a baseband signal and a bit stream according to the physical layer specification of a system. For example, when data is transmitted, the baseband processing unit 720 generates complex symbols by encoding and modulating a transmission bit stream. In addition, when data is received, the baseband processing unit 720 restores a reception bit stream by demodulating and decoding the baseband signal provided from the RF processing unit 710. The baseband processing unit 720 may include a plurality of components for each function performed by the baseband processing unit 720.

The controller 730 controls overall operations of the terminal. For example, the controller 730 transmits and receives a signal through the baseband processing unit 720 and the RF processing unit 710. According to an embodiment of the present disclosure, the controller 730 includes a dynamic power control module 732 to control the RF processing unit 710 and the baseband processing unit 720 such that the terminal is operated in the dynamic power saving mode. For example, the controller 730 controls the terminal to perform the procedures illustrated in FIGS. 4 and 5. An operation of the controller 730 according to an embodiment of the present disclosure is as follows.

According to an embodiment of the present disclosure, the controller 730 activates all components in the RF processing unit 710 and the baseband processing unit 720, and receives and decodes a control signal containing data allocation information in the transmission interval through the RF processing unit 710 and the baseband processing unit 720. After decoding the control information, the controller 730 analyzes information decoded from the control signal, thereby determining whether downlink data is present. If the downlink data is not present, the controller 730 deactivates some components in the RF processing unit 710 and the baseband processing unit 720 during the transmission interval. Specifically, the controller 730 controls the components, and particularly, controls each component or each component group to have one of a power-off state, a stand-by state or a sleep state, and an always-on state.

According to another embodiment of the present disclosure, the controller 730 collects channel condition information, and selects a number of reference signals and a channel estimation mode for channel estimation of the control channel, based on the channel condition information. If multiple carrier frequencies are used, the terminal independently performs the above-described decision on each component carrier. Subsequently, the controller 730 performs channel estimation according to the selection, and decodes the control channel. In addition, if there is no downlink data in the transmission interval during which the control signal is received, the controller 730 selects a number of reference signals and a channel estimation mode for channel estimation of a data channel, based on the channel condition information, performs the channel estimation according to the selection, and decodes the data channel.

In the embodiment described with reference to FIG. 7A, the controller 730 deactivates some hardware components for signal reception if there is no downlink data in the transmission interval. However, according to another embodiment of the present disclosure, even if the downlink data is present, the controller 730 may deactivate some hardware components in some of the transmission interval unless the downlink data is received throughout the transmission interval. In this case, some components, which are deactivated when there is no downlink data throughout the transmission interval, may differ from some components which are deactivated when there is no downlink data in some of the transmission interval.

In the embodiment described with reference to FIG. 7A, the dynamic power control module 732 is included in the controller 730. However, according to another embodiment of the present disclosure, the dynamic power control module 732 may be included in another block.

Figure 7B:
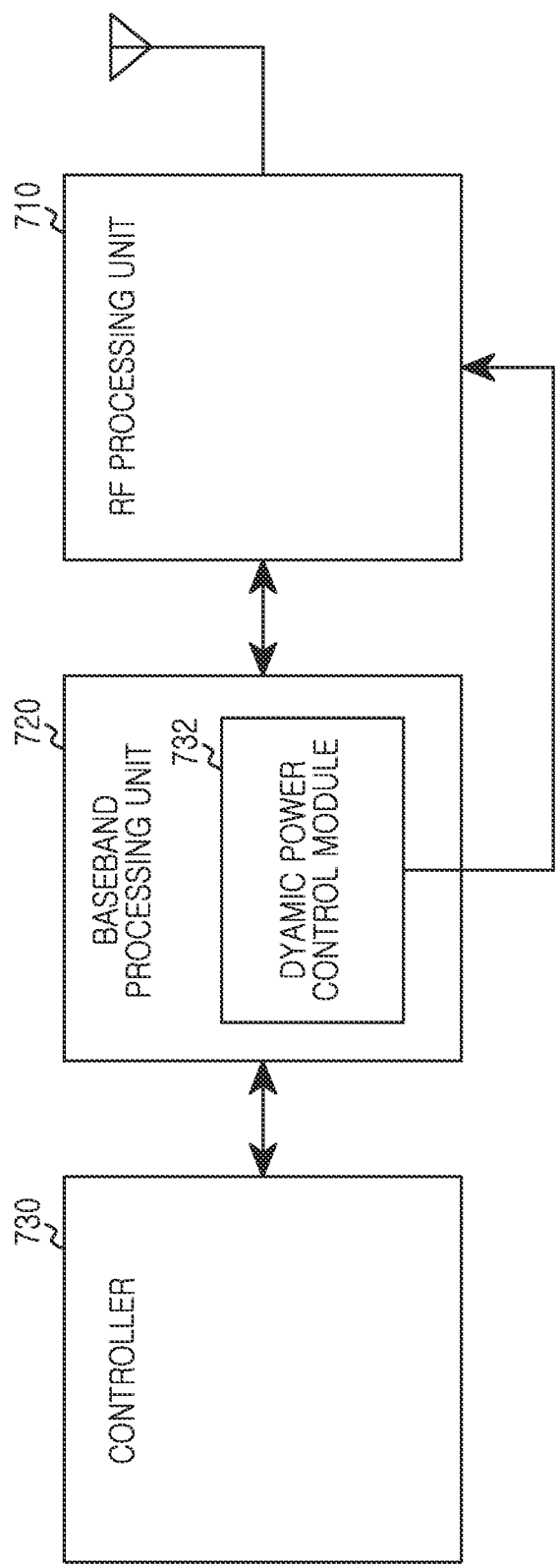
FIG. 7B is a block diagram illustrating a configuration of a terminal in a wireless communication system according to an embodiment of the present disclosure.

Referring to FIG. 7B, the dynamic power control module 732 may be included in the baseband processing unit 720.

Figure 7C:
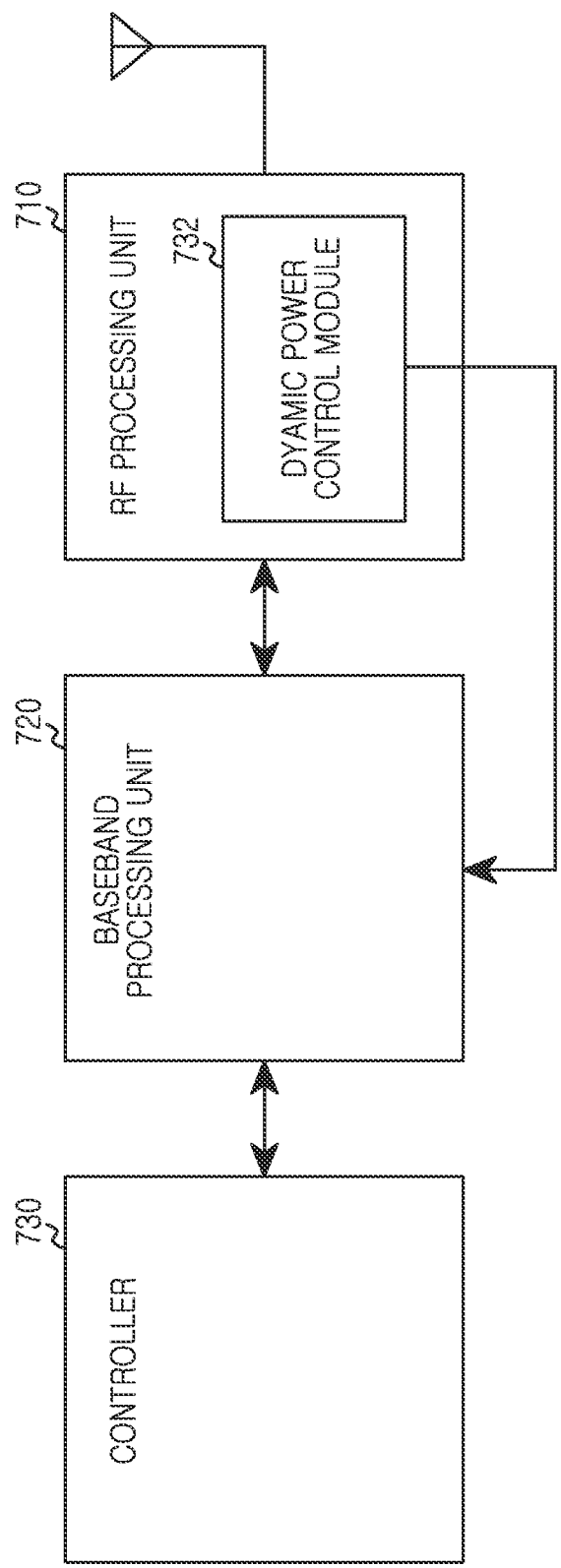
FIG. 7C is a block diagram illustrating a configuration of a terminal in a wireless communication system according to an embodiment of the present disclosure.

Referring to FIG. 7C, a dynamic power control module 732 may be included in the RF processing unit 710.

Figure 7D:
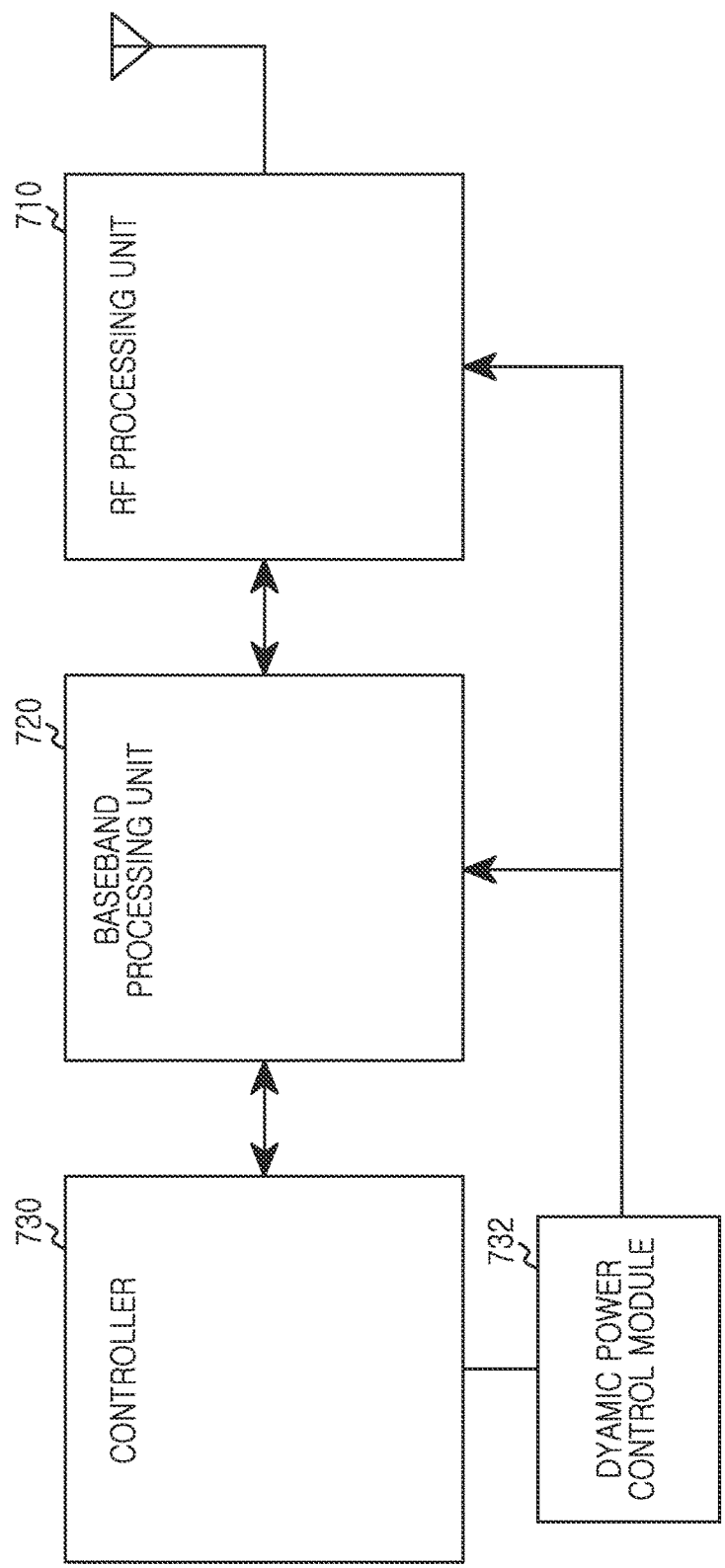
FIG. 7D is a block diagram illustrating a configuration of a terminal in a wireless communication system according to an embodiment of the present disclosure.

Referring to FIG. 7D, the dynamic power control module 732 may be configured separately from the RF processing unit 710, the baseband processing unit 720, and the controller 730.

Figure 8:
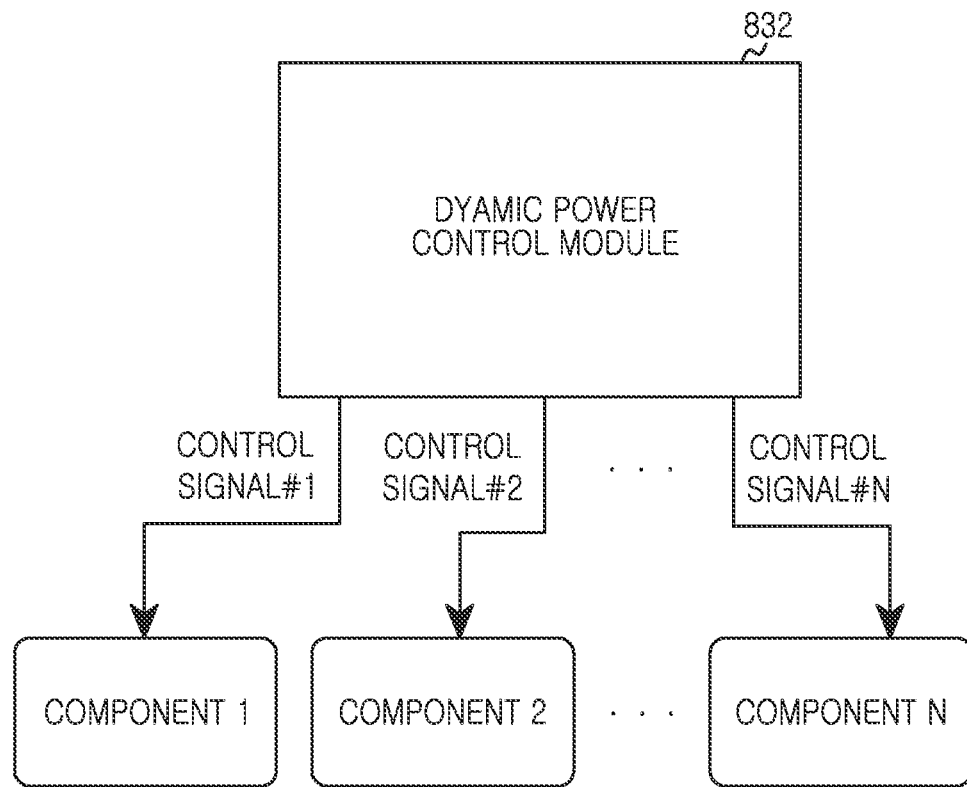
FIG. 8 illustrates signals output from a dynamic power control module in a wireless communication system according to an embodiment of the present disclosure.

FIG. 8 illustrates signals output from a dynamic power control module in a wireless communication system according to an embodiment of the present disclosure.

Referring to FIG. 8, the dynamic power control module 832 outputs control signals for controlling states of hardware components for signal reception. The control signals applied to the respective components may vary with each component and conditions of controlling each component (e.g., a power-off, a stand-by state, a sleep state, and the like).

For example, when it is desired to switch a component to a power-off state, the dynamic control module 832 may apply a signal of a value indicating disabling of the power supply circuit, to an enable pin which enables/disables the component. Alternatively, when a power supply circuit for supplying power used for operation of the component is separately provided, the dynamic power control module 832 may cut off power supplied to the component by disabling the power supply circuit. In addition, when it is desired to switch a component to a stand-by state, the dynamic control module 832 may apply a signal of a value indicating a stand-by state, to a pin which switches the component to the stand-by state. In other words, the dynamic power control module 832 may output a signal of a value corresponding to a power-off state, to a path connected to a pin for power-off in order to switch the component to the power-off state. In addition, the dynamic power control module 832 may also output a signal of a value corresponding to a stand-by state, to a path connected to a pin for switching to the stand-by state in order to switch the component to the stand-by state.

As described above, the component may include a pin for enabling/disabling, and a pin for switching to the stand-by state. In another example of the present disclosure, the component may have a plurality of pins for setting an operation mode, and a mode of the component may be changed by a combination of values applied to the pins. In this case, the dynamic power control module 832 may switch the component to the power-off state or the stand-by state by applying signals of values corresponding to the power-off state or the stand-by state to the pins for mode control. In other words, the dynamic power control module 832 may output signals of values corresponding to a power-off state, to paths connected to the pins for mode setting in order to switch the component to the power-off state, and also output signals of values corresponding to a stand-by state, to paths connected to the pins for mode setting in order to switch the component to the stand-by state.

Methods according to embodiments described in the claims or embodiments of the present disclosure may be implemented in the form of hardware, software or a combination thereof.

In embodiments of the present disclosure, components included in the disclosure are expressed in the singular or plural form according to the specific embodiments presented herein. However, the singular or plural wordings are selected suitably for circumstances presented for convenience of description. Accordingly, the present disclosure is not limited to the singular or plural component(s). Even if the component is expressed in the plural form, it may be configured singularly. In addition, even if the component is expressed in the singular form, it may be configured in the plural form.

When power control is performed for the dynamic power saving mode in one transmission interval, it is possible to maximize the power saving effect by controlling power of each component or each component group at an RF stage.

Furthermore, when power control is performed according to the dynamic power saving mode in one transmission interval, it is possible to maximize the power saving effect and minimize performance degradation caused by the dynamic power saving mode operation, by operating hardware components of the baseband modem according to multiple modes.

Moreover, in the case of a carrier wave aggregation using multiple carrier frequencies, the power saving effect can be maximized by performing power control on the hardware components by a component carrier.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a terminal in a wireless communication system, the method comprising:
   receiving control information through a control channel during a first period of a transmission interval, wherein the transmission interval comprises the first period and a second period including a power controllable interval;
   deactivating a part of components for signal reception during the power controllable interval of the transmission interval by generating a plurality of control signals to change a state of each component in the deactivated part of the components, if it is determined that there is no data to be received during the power controllable interval of the transmission interval based on the control information; and
   receiving another control information by activating the components for the signal reception in a next transmission interval,
   wherein at least two components in the deactivated part of the components are in different states during the power controllable interval of the transmission interval, and
   wherein the power controllable interval is determined based on a switching time and a time taken to normalize an internal initial value problem associated with each of the components for signal reception.

2. The method of claim 1, further comprising:
   determining whether the data to be received during the transmission interval is present based on the control information.

3. The method of claim 1, wherein the deactivated part of the components for signal reception is selected based on at least one of a warm-up time and the internal initial value problem.

4. The method of claim 1, wherein the deactivating of the part of the components for signal reception comprises at least one of switching to a power-off state, switching to a stand-by state, and switching to a sleep state.

5. The method of claim 4,
   wherein at least one of the deactivated part is powered off, and
   wherein a rest of the deactivated part is switched to the stand-by state or the sleep state.

6. The method of claim 1, wherein each of the components comprises at least one of a Phase Loop Lock (PLL), a Voltage Control Oscillator (VCO), a Low Noise Amplifier (LNA), a mixer, a Local Oscillator (LO), and an Analog to Digital Converter (ADC).

7. The method of claim 1, wherein the transmission interval is one of a transmission time interval (TTI) and a subframe.

8. The method of claim 1, wherein the receiving of the control information comprises estimating the control channel using reference signals transferred through the transmission interval.

9. The method of claim 8, wherein a number of the reference signals, used for the estimating of the control channel, is determined based on a channel condition.

10. The method of claim 8, wherein the estimating of the control channel comprises selecting a channel estimation mode based on a channel condition.

11. A terminal apparatus in a wireless communication system, the apparatus comprising:
    a plurality of components configured to receive signals; and
    at least one processor configured to:
    control the plurality of components to receive control information through a control channel during a first period of a transmission interval, wherein the transmission interval comprises the first period and a second period including a power controllable interval,
    control a part of the plurality of components to be deactivated during the power controllable interval of the transmission interval by generating a plurality of control signals to change a state of each component in the deactivated part of the plurality of components, if it is determined that there is no data to be received during the power controllable interval of the transmission interval based on the control information, and
    control the plurality of components for the signal reception to be activated to receive another control information in a next transmission interval, wherein at least two components in the deactivated part of the components are in different states during the power controllable interval of the transmission interval, and
    wherein the power controllable interval is determined based on a switching time and a time taken to normalize an internal initial value problem associated with each of the components for signal reception.

12. The apparatus of claim 11, wherein the at least one processor is further configured to determine whether data to be received during the transmission interval is present based on the control information.

13. The apparatus of claim 11, wherein the deactivated part of the plurality of components is selected based on at least one of a warm-up time and the internal initial value problem.

14. The apparatus of claim 11, wherein the deactivating comprises at least one of switching to a power-off state, switching to a stand-by state, and switching to a sleep state.

15. The apparatus of claim 14,
wherein at least one of the deactivated part is powered off, and
wherein a rest of the deactivated part is switched to the stand-by state or the sleep state.

16. The apparatus of claim 11, wherein each of the plurality of components comprises at least one of a Phase Loop Lock (PLL), a Voltage Control Oscillator (VCO), an Low Noise Amplifier (LNA), a mixer, an Local Oscillator (LO), and an Analog to Digital Converter (ADC).

17. The apparatus of claim 11, wherein the transmission interval is one of a transmission time interval (TTI) and a subframe.

18. The apparatus of claim 11, wherein the at least one processor is further configured to estimate the control channel using reference signals transferred through the transmission interval.

19. The apparatus of claim 18, wherein a number of the reference signals, used for the estimating of the control channel, is determined based on a channel condition.

20. The apparatus of claim 18, wherein the at least one processor is further configured to select a channel estimation mode based on a channel condition.

21. A terminal apparatus in a wireless communication system, the apparatus comprising:
a plurality of components; and
a control circuitry configured to:
control the plurality of components to receive control information through a control channel during a first period of a transmission interval by generating a plurality of control signals to change a state of each component in a part of the plurality of components, wherein the transmission interval comprises the first period and a second period including a power controllable interval,
control a part of the plurality of components to be deactivated during the power controllable interval of the transmission interval, if there is no data to be received in the transmission interval, and control the plurality of components to be activated to receive another control information in a next transmission interval,
wherein the deactivated part of the plurality of components is selected based on a warm-up time of each of the plurality of components, and
wherein the power controllable interval is determined based on a switching time and a time taken to normalize an internal initial value problem associated with each of the components for signal reception.

22. The apparatus of claim 21,
wherein the plurality of components is included in a Radio Frequency (RF) processing circuitry and a baseband processing circuitry, and
wherein the RF processing circuitry comprises the control circuitry and is configured to convert an RF signal to a baseband signal.

23. The apparatus of claim 21,
wherein the plurality of components is included in a Radio Frequency (RF) processing circuitry and a baseband processing circuitry, and
wherein the baseband processing circuitry comprises the control circuitry and is configured to demodulate and decode a baseband signal.

24. The apparatus of claim 21, further comprising at least one processor comprising the control circuitry, the at least one processor configured to determine whether data to be received is present.

25. The apparatus of claim 21, wherein, when the part of the plurality of components is to be deactivated, the part is switched to at least one of a power-off state, a stand-by state, and a sleep state.

26. The apparatus of claim 25,
wherein at least one of the deactivated part is powered off, and
wherein a rest of the deactivated part is switched to the stand-by state or the sleep state.

27. The apparatus of claim 21, wherein each of the plurality of components comprises at least one of a Phase Loop Lock (PLL), a Voltage Control Oscillator (VCO), an Low Noise Amplifier (LNA), a mixer, an Local Oscillator (LO), and an Analog to Digital Converter (ADC).

28. The apparatus of claim 21, wherein the transmission interval is one of a transmission time interval (TTI) and a subframe.

29. A terminal apparatus in a wireless communication system, the apparatus comprising:
a plurality of components configured to receive signals; and
at least one processor configured to:
control the plurality of components to receive control information through a control channel during a first period of a transmission interval, wherein the transmission interval comprises the first period and a second period including a power controllable interval,
control a part of the plurality of components to be deactivated during the power controllable interval of the transmission interval, if there is no data to be received in the transmission interval, and
control the plurality of components to be activated to receive another control information in a next transmission interval,
wherein the deactivated part of the plurality of components is selected based on a control timing required to receive the other control information,
wherein the control timing is determined based on a duration of a transition from a deactivation state to an activation state of each of the plurality of components, and
wherein the power controllable interval is determined based on a switching time and a time taken to normalize an internal initial value problem associated with each of the components for signal reception.

30. The apparatus of claim 29, wherein the deactivated part of the plurality of components is selected based on at least one of a warm-up time and the internal initial value problem.

31. The apparatus of claim 29, wherein, when the part of the plurality of components is to be deactivated, the part is switched to at least one of a power-off state, a stand-by state, and a sleep state.

32. The apparatus of claim 29, wherein each of the plurality of components comprises at least one of a Phase Loop Lock (PLL), a Voltage Control Oscillator (VCO), an Low Noise Amplifier (LNA), a mixer, an Local Oscillator (LO), and an Analog to Digital Converter (ADC).

33. The method of claim 1, wherein the receiving of the control information comprises:
   estimating a control channel carrying the control information using a part of reference signals transferred through the transmission interval; and
   decoding the control information based on an estimation of the control channel.

34. The method of claim 33, further comprising:
   estimating a data channel carrying downlink data signals using all of the reference signals; and
   decoding the downlink data signals based on an estimation of the data channel.

35. The method of claim 1, wherein the deactivating of the part of components comprises, deactivating the part of components while the terminal is in a connected state.

36. The apparatus of claim 11, wherein the at least one processor is further configured to deactivate the part of components while the terminal is in a connected state.

37. The method of claim 1, wherein the different states depend on a duration of a transition from a deactivation state to an activation state of each of the at least two components.

* * * * *